United States Patent
Han

(10) Patent No.: US 9,885,300 B2
(45) Date of Patent: Feb. 6, 2018

(54) METHOD AND SYSTEM FOR CONTROLLING ENGINE USING COMBUSTION PRESSURE SENSOR

(71) Applicant: HYUNDAI MOTOR COMPANY, Seoul (KR)

(72) Inventor: Kyoungchan Han, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 279 days.

(21) Appl. No.: 14/752,644

(22) Filed: Jun. 26, 2015

(65) Prior Publication Data

US 2016/0108843 A1    Apr. 21, 2016

(30) Foreign Application Priority Data

Oct. 20, 2014 (KR) ........................ 10-2014-0142065

(51) Int. Cl.
| | | |
|---|---|---|
| F02D 35/00 | (2006.01) | |
| F02D 41/00 | (2006.01) | |
| F02D 41/40 | (2006.01) | |
| F02P 5/15 | (2006.01) | |
| F02D 35/02 | (2006.01) | |
| F02D 37/02 | (2006.01) | |
| F02P 5/04 | (2006.01) | |

(52) U.S. Cl.
CPC ....... F02D 41/0085 (2013.01); F02D 35/023 (2013.01); F02D 37/02 (2013.01); F02D 41/402 (2013.01); F02P 5/1512 (2013.01); F02D 35/028 (2013.01); F02P 5/045 (2013.01); Y02T 10/44 (2013.01); Y02T 10/46 (2013.01)

(58) Field of Classification Search
CPC .. F02D 41/401; F02D 35/028; F02D 41/0085; F02D 35/023; F02D 35/024; F02D 37/02
USPC .......................... 123/435; 701/102–105, 111
See application file for complete search history.

(56) References Cited

U.S. PATENT DOCUMENTS

| | | | | |
|---|---|---|---|---|
| 4,495,920 A | * | 1/1985 | Matsumura | .......... F02M 41/125 |
| | | | | 123/436 |
| 4,697,561 A | * | 10/1987 | Citron | ................. F02D 41/0085 |
| | | | | 123/339.14 |
| 5,050,556 A | * | 9/1991 | Williams | .............. F02D 35/022 |
| | | | | 123/406.28 |

(Continued)

FOREIGN PATENT DOCUMENTS

| | | |
|---|---|---|
| JP | 07-229443 A | 8/1995 |
| JP | 07-037789 B2 | 4/1996 |

(Continued)

*Primary Examiner* — Thomas Moulis
(74) *Attorney, Agent, or Firm* — McDermott Will & Emery LLP

(57) ABSTRACT

A method for controlling an engine which comprises a combustion pressure sensor includes receiving a combustion pressure signal from the combustion pressure sensor. An Indicated mean effective pressure (IMEP) deviation for each cylinder and an IMEP deviation for each driving cycle for the engine are calculated based on a combustion pressure according to the received combustion pressure signal. A main injection timing is set based on a difference between the calculated IMEP deviations for the each cylinder and a difference between the calculated IMEP deviations for the each driving cycle. The engine runs by injecting a fuel according to the set main injection timing.

6 Claims, 5 Drawing Sheets

(56) References Cited

U.S. PATENT DOCUMENTS

| | | | |
|---|---|---|---|
| 5,069,183 A | 12/1991 | Nagano et al. | |
| 5,287,735 A * | 2/1994 | Klauber | B60G 17/019 |
| | | | 73/114.02 |
| 5,604,303 A * | 2/1997 | Tomisawa | G01M 15/08 |
| | | | 73/114.06 |
| 5,605,132 A * | 2/1997 | Hori | F02D 41/1498 |
| | | | 123/406.24 |
| 5,715,794 A * | 2/1998 | Nakamura | F02D 21/08 |
| | | | 123/305 |
| 5,738,074 A * | 4/1998 | Nakamura | F02D 35/023 |
| | | | 123/305 |
| 5,778,857 A * | 7/1998 | Nakamura | F02D 35/023 |
| | | | 123/406.29 |
| 6,209,520 B1 * | 4/2001 | Kolmanovsky | F02D 35/023 |
| | | | 123/435 |
| 6,230,683 B1 * | 5/2001 | zur Loye | F02B 1/12 |
| | | | 123/27 GE |
| 6,276,334 B1 * | 8/2001 | Flynn | F02B 19/14 |
| | | | 123/435 |
| 6,286,482 B1 * | 9/2001 | Flynn | F02B 1/12 |
| | | | 123/25 C |
| 6,408,819 B1 * | 6/2002 | Mezger | F02D 35/024 |
| | | | 123/406.29 |
| 6,491,024 B1 * | 12/2002 | Connolly | F02D 41/06 |
| | | | 123/406.19 |
| 6,516,780 B2 * | 2/2003 | Liu | F02D 35/023 |
| | | | 123/406.14 |
| 6,542,798 B2 * | 4/2003 | Kotre | B60K 6/445 |
| | | | 180/65.1 |
| 6,598,468 B2 * | 7/2003 | Zur Loye | F02D 35/023 |
| | | | 73/114.06 |
| 7,257,479 B2 * | 8/2007 | Damitz | F02D 35/02 |
| | | | 123/399 |
| 7,318,411 B1 * | 1/2008 | Zhu | F02P 3/0456 |
| | | | 123/406.14 |
| 8,141,540 B2 * | 3/2012 | Wagner | F02D 41/0085 |
| | | | 123/436 |
| 2008/0147299 A1 * | 6/2008 | Haraguchi | F02D 35/023 |
| | | | 701/103 |
| 2009/0082940 A1 * | 3/2009 | Ishizuka | F02D 35/02 |
| | | | 701/103 |
| 2010/0241341 A1 * | 9/2010 | Yun | F02B 1/12 |
| | | | 701/113 |
| 2011/0132332 A1 | 6/2011 | Caretta et al. | |
| 2012/0103304 A1 * | 5/2012 | Kang | F02D 35/023 |
| | | | 123/305 |
| 2012/0310505 A1 * | 12/2012 | Morgan | F02D 35/024 |
| | | | 701/102 |
| 2013/0024089 A1 * | 1/2013 | Wang | F02D 41/1462 |
| | | | 701/102 |
| 2013/0080026 A1 * | 3/2013 | Kang | F02D 13/0207 |
| | | | 701/102 |
| 2013/0151122 A1 * | 6/2013 | Jin | F02D 41/1498 |
| | | | 701/104 |
| 2014/0048038 A1 * | 2/2014 | Yasuda | F02D 35/023 |
| | | | 123/395 |

FOREIGN PATENT DOCUMENTS

| | | |
|---|---|---|
| JP | 08-319866 A | 12/1996 |
| JP | 2010-127172 A | 6/2010 |
| JP | 2012-117428 A | 6/2012 |
| KR | 10-0325154 B1 | 2/2002 |

\* cited by examiner

METHOD AND SYSTEM FOR CONTROLLING ENGINE USING COMBUSTION PRESSURE SENSOR

CROSS-REFERENCE TO RELATED APPLICATION

This application claims the benefit of priority to Korean Patent Application No. 10-2014-0142065 filed in the Korean Intellectual Property Office on Oct. 20, 2014, the entire content of which is incorporated herein by reference.

TECHNICAL FIELD

The present disclosure relates to a method and system for controlling an engine using a combustion pressure sensor, and more particularly, to a method and system for controlling an engine using a combustion pressure sensor capable of improving idle stability by reducing an indicated mean effective pressure (IMEP) deviation for each cylinder and an IMEP deviation for each driving cycle for the engine.

BACKGROUND

When an ignition switch of a vehicle is on, a starting motor rotates and starts an engine in which a mixed gas of air and fuel may be combusted and explode in a combustion chamber of the engine. When an engine speed is equal to or more than a predetermined speed (for example, 800 RPM) after the engine starts, an engine control unit (ECU) controls the engine in an idle condition or an idle region. The ECU controls a fuel injection amount so that the engine speed may be a target speed in the idle region.

In the conventional engine control system and method, optimal values of engine control parameters (for example, an exhaust-gas recirculation (EGR) parameter, a boost parameter, an injection parameter, and so on) are logically inputted to control the engine in a room temperature condition, while engine developers analyze data with respect to an engine start test to search and apply optimal values in a low temperature condition of the engine.

Therefore, according to the conventional engine control system and method, since many tests are performed for each temperature and atmospheric pressure condition, development time and cost increase.

In addition, according to the conventional engine control system and method, when startability and idle stability deteriorate due to deterioration of hardware of the engine, a combustion state related to deterioration of the startability and idle stability may not be monitored.

Furthermore, according to the conventional engine control system and method, since a fuel injection amount is controlled to maintain engine idle speed in an idle region, indicated mean effective pressure (IMEP) control is difficult.

In the conventional engine control system and method, although a target control value for mass fraction burned 50% (MFB50), which is a point of time of 50% of the total amount of combustion heat is corrected considering influence by atmospheric temperature, atmospheric pressure, and coolant temperature, it is difficult to improve the idle stability due to the deterioration of the engine and an environmental condition in spite of performing MFB50 control with the corrected target control value.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a method and system for controlling an engine using a combustion pressure sensor installed in a cylinder of the engine capable of improving idle stability by reducing an indicated mean effective pressure (IMEP) deviation for each cylinder and an IMEP deviation for each driving cycle for the engine using a combustion signal detected by the combustion pressure sensor.

As is well-known to a person of ordinary skill in the art, the IMEP indicates a torque generated during combustion and is a standard for determining combustion efficiency of an engine.

According to an exemplary embodiment of the present inventive concept, a method for controlling an engine having a combustion pressure sensor includes receiving a combustion pressure signal from the combustion pressure sensor. An IMEP deviation for each cylinder and an IMEP deviation for each driving cycle for the engine are calculated based on a combustion pressure according to the received combustion pressure signal. A main injection timing is set based on a difference between the calculated IMEP deviations for the each cylinder and a difference between the calculated IMEP deviations for the each driving cycle. The engine runs by injecting a fuel according to the set main injection timing.

The method may further include comparing the difference between the calculated IMEP deviations for the each cylinder and the difference between the calculated IMEP deviations for the each driving cycle with a IMEP deviation reference. A target ignition timing is advanced by a predetermined angle when the difference between the calculated IMEP deviations for the each cylinder or the difference between the calculated IMEP deviations for the each driving cycle is greater than the IMEP deviation reference.

The step of advancing the target ignition timing may include advancing a 50% mass fraction burned (MFB50) target control value.

The main injection timing may be updated according to the MFB50 target control value.

The calculated IMEP deviations for the each cylinder and the calculated IMEP deviations for the each driving cycle may be calculated by the following equation, $$\text{IMEP deviation} = (\text{standard deviation IMEP})/(\text{average IMEP}).$$

According to another embodiment of the present inventive concept, a system for controlling an engine having a combustion pressure sensor includes a coolant sensor configured to detect a coolant temperature. An atmospheric pressure sensor is configured to detect atmospheric pressure. An atmospheric temperature sensor is configured to detect atmospheric temperature. An engine controller is configured to receive signals from the combustion pressure sensor, the coolant sensor, the atmospheric pressure sensor, and the atmospheric temperature sensor, and to control the engine based on the received signals.

As described above, according to an embodiment of the present invention, the method and system for controlling an engine using a combustion pressure sensor installed in a cylinder of an engine can be provided to improve an idle stability by reducing an indicated mean effective pressure (IMEP) deviation for each cylinder and an IMEP deviation for each driving cycle for an engine using a combustion signal detected by the combustion pressure sensor.

DETAILED DESCRIPTION OF THE EMBODIMENTS

The present disclosure will be described more fully hereinafter with reference to the accompanying drawings, in which exemplary embodiments of the inventive concept are shown. As those skilled in the art would realize, the described embodiments may be modified in various different ways, all without departing from the spirit or scope of the present disclosure.

In addition, in the specification, unless explicitly described to the contrary, the word "comprise" and variations such as "comprises" or "comprising" will be understood to imply the inclusion of stated elements but not the exclusion of any other elements.

Figure 1:
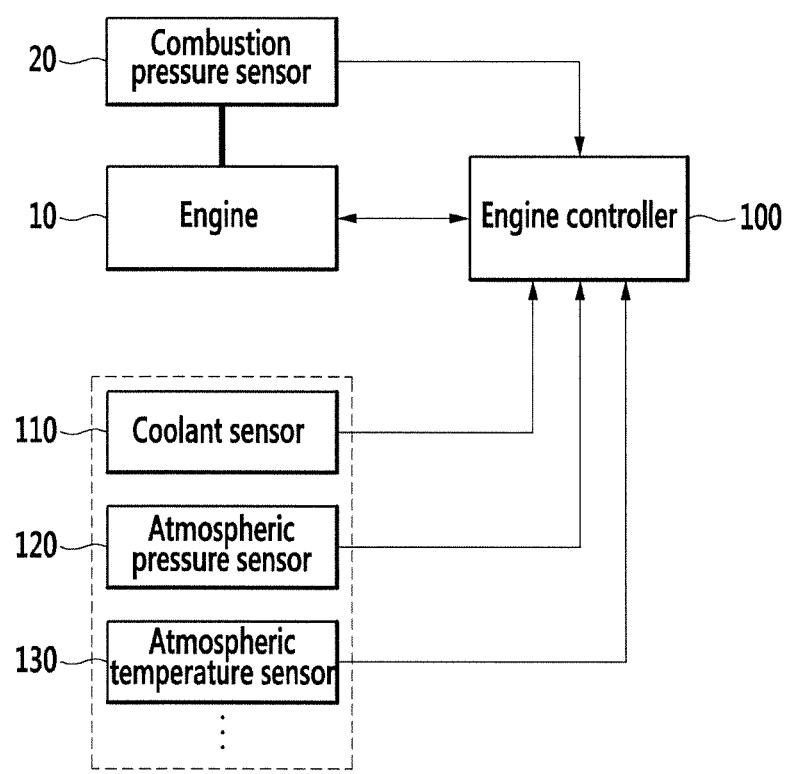
FIG. 1 is a block diagram of a system for controlling an engine using a combustion pressure sensor according to an exemplary embodiment of the present inventive concept.

FIG. 1 is a block diagram of a system for controlling an engine using a combustion pressure sensor according to an exemplary embodiment of the present inventive concept.

The system according to an exemplary embodiment of the present inventive concept improves idle stability of an engine in which a combustion pressure sensor is installed.

The system according to an exemplary embodiment of the present inventive concept includes a coolant sensor 110 configured to detect coolant temperature, an atmospheric pressure sensor 120 configured to detect atmospheric pressure, and an atmospheric temperature sensor 130 configured to detect atmospheric temperature. An engine controller 100 is configured to receive signals from a combustion pressure sensor 20, the coolant sensor 110, the atmospheric pressure sensor 120, and the atmospheric temperature sensor 130, and to control an engine 10 based on the received signals.

The coolant sensor 110, the atmospheric pressure sensor 120, and the atmospheric temperature sensor 130 output the signals for correction associated with environmental change while the engine 10 is controlled, but it should be understood that the scope of the present disclosure is not limited thereto. The technical spirit of the present disclosure may be applicable to other sensors that can substantially output signals for correction associated with environmental change while the engine 10 is controlled.

The combustion pressure sensor 20 is installed in a cylinder of the engine 10 to detect a combustion pressure in the cylinder. The combustion pressure sensor 20 may be installed in each cylinder of the engine 10 or a selective cylinder(s) considering design and cost of the engine 10.

Since the combustion pressure sensor 20 applied to the present disclosure is well-known to a person of an ordinary skill in the art, a detailed description for configuration and operation thereof will be omitted.

The engine controller 100 is one or more microprocessors and/or hardware including a microprocessor that can be operated by a predetermined program, and the predetermined program may include a series of commands for executing the method for controlling the engine using the combustion pressure sensor to be described later according to the exemplary embodiment of the present inventive concept.

In the present disclosure, the engine controller 100 may be included in a conventional ECU, or may include the conventional ECU.

A method for controlling an engine using a combustion pressure sensor will now be described in detail with reference to the accompanying drawings.

Figure 2:
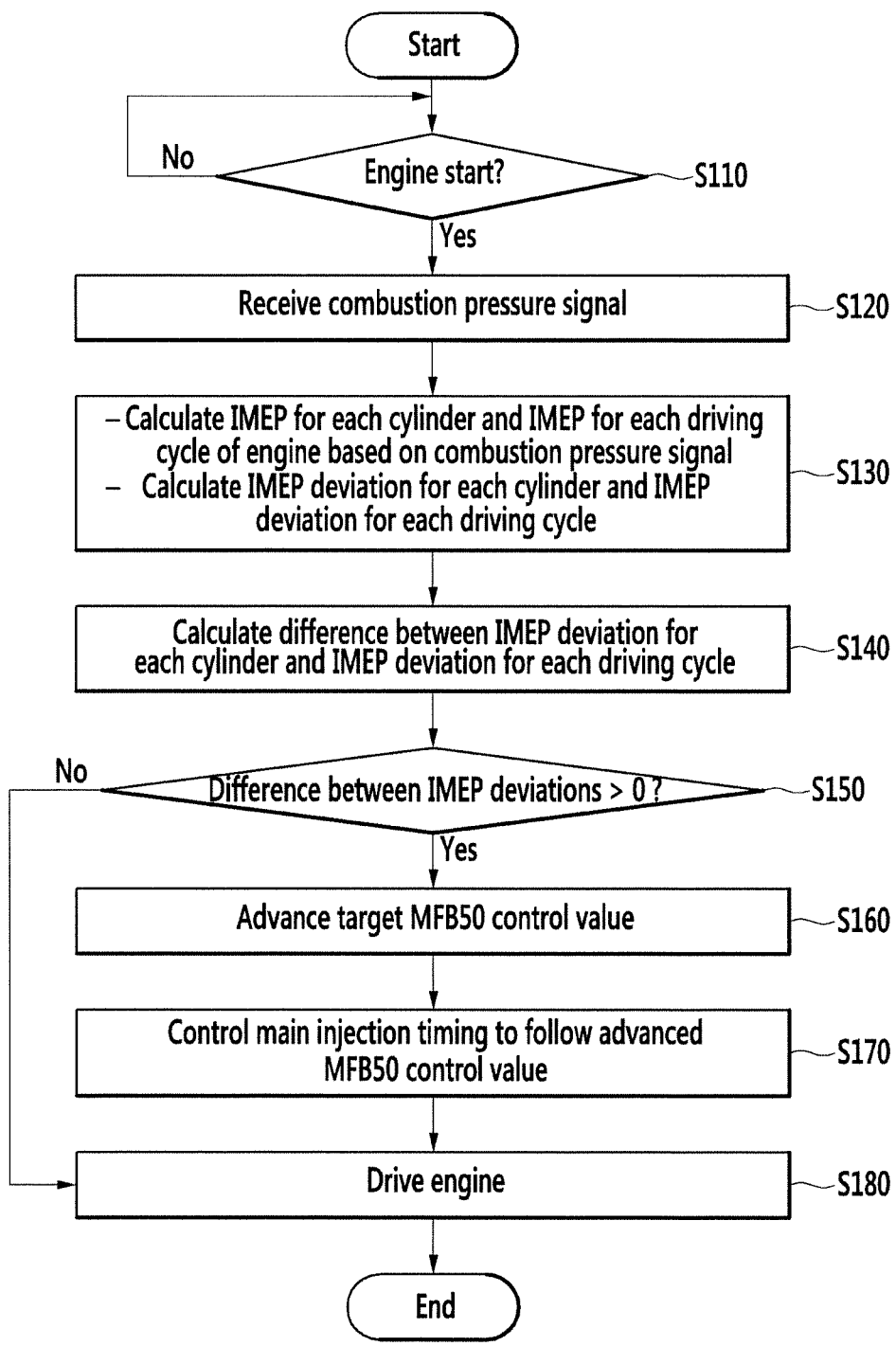
FIG. 2 is a flowchart of a method for controlling an engine using a combustion pressure sensor according to an exemplary embodiment of the present inventive concept.

FIG. 2 is a flowchart of a method for controlling an engine using a combustion pressure sensor according to an exemplary embodiment of the present inventive concept.

As shown in FIG. 2, the engine controller 100 determines whether the engine 10 has started and then is in an idle state (S110).

Figure 3:
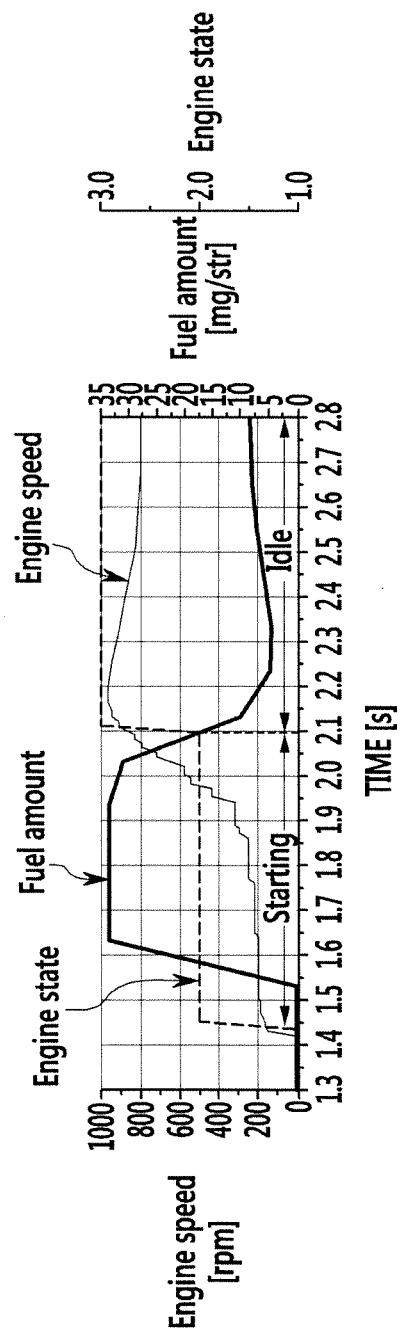
FIGS. 3 to 5 are graphs for illustrating operation of a system and method for controlling an engine using a combustion pressure sensor according to an exemplary embodiment of the present inventive concept.

The process until the engine 10 starts and is in the idle state is shown in FIG. 3 as is well-known to a person of an ordinary skill in the art.

When the engine 10 runs in the idle state, the engine controller 100 receives a combustion pressure signal from the combustion pressure sensor 20 (S120).

When the engine controller 100 receives the combustion pressure signal, the engine controller 100 may also receive signals from the coolant sensor 110, the atmospheric pressure sensor 120, the atmospheric temperature sensor 130 and so on, as is well-known to a person of an ordinary skill in the art.

When the combustion pressure signal is received, the engine controller 100 calculates an IMEP for each cylinder and an IMEP for each driving cycle for the engine 10 based on a combustion pressure corresponding to the received combustion pressure signal. The engine controller 100 then calculates IMEP deviations (IMEP_COV_act1) for each cylinder and IMEP deviations (IMEP_COV_act2) for each driving cycle based on the calculated IMEP for each cylinder and the calculated IMEP for each driving cycle. Further, the engine controller 100 calculates a predetermined IMEP deviation (IMEP_COV_ref1) for each cylinder and a predetermined IMEP deviation (IMEP_COV_ref2) for each driving cycle (S130). The COV refers to coefficient of variation.

The IMEP deviation for each cylinder and the IMEP deviation for each driving cycle may be calculated by the following equation.

IMEP deviation=(standard deviation IMEP)/(average IMEP)

The engine controller 100 may calculate a standard deviation IMEP and an average IMEP based on the combustion pressure, as is well-known to a person of an ordinary skill in the art.

Figure 4:
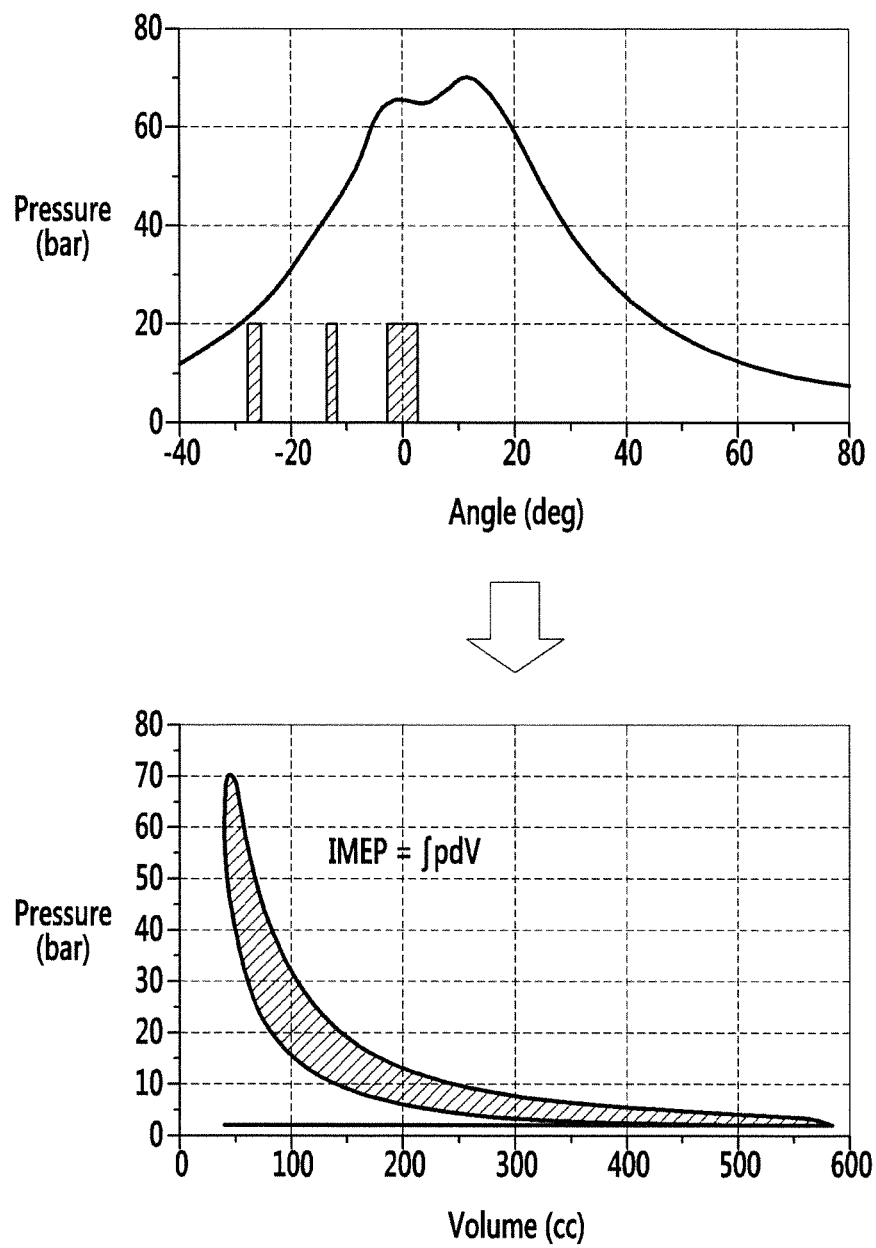

The predetermined IMEP deviation (IMEP_COV_ref1) and the predetermined IMEP deviation (IMEP_COV_ref2) may be calculated by the following equations, or may be obtained through simulation and experiment.

$$\frac{dQ_{chem}}{d\theta} = \left[\frac{k}{k-1}\right]P\frac{dV}{d\theta} + \left[\frac{1}{k-1}\right]V\frac{dP}{d\theta}$$

$$IMEP = \int pdV,$$

where Q: combustion heat, θ: crank angle, k: coefficient, V: cylinder volume, and P: combustion pressure FIG. 4 is a graph associated with the equations for calculating the IMEP.

When the IMEP deviation (IMEP_COV_act1), IMEP deviation (IMEP_COV_act2), the predetermined IMEP deviation (IMEP_COV_ref1), and the predetermined IMEP deviation (IMEP_COV_ref2) are calculated, the engine controller 100 determines a main injection timing based on difference (IMEP_COV_Dvt1) between the calculated IMEP deviations (IMEP_COV_act1) (IMEP_COV_act2) and difference (IMEP_COV_Dvt2) between the calculated IMEP deviations (IMEP_COV_ref1)(IMEP_COV_ref2) (S140).

The difference (IMEP_COV_Dvt1) and the difference (IMEP_COV_Dvt2) may be calculated by the following equations.

$$IMEP\_COV\_Dvt1 = IMEP\_COV\_act1 - IMEP\_COV\_ref1$$

$$IMEP\_COV\_Dvt2 = IMEP\_COV\_act2 - IMEP\_COV\_ref2$$

When the difference (IMEP_COV_Dvt1) and the difference (IMEP_COV_Dvt2) are calculated, the engine controller 100 determines whether the difference (IMEP_COV_Dvt1) and the difference (IMEP_COV_Dvt2) are greater than a predetermined value, e.g., 0 (S150).

When at least one of the difference (IMEP_COV_Dvt1) and the difference (IMEP_COV_Dvt2) is greater than the predetermined value, the engine controller 100 determines that the engine 10 is unstable and then advances a target ignition timing (that is, an MFB50 target control value) by a predetermined angle to improve combustion stability (S160).

When both the difference (IMEP_COV_Dvt1) and the difference (IMEP_COV_Dvt2) are greater than the predetermined value, the engine controller 100 may advance the target ignition timing by a predetermined angle to improve the combustion stability considering design and characteristics of the engine 10.

When the MFB50 target control value is advanced by the predetermined angle, the engine controller 100 operates the engine 10 with updating the main injection timing to follow the predetermined MFB50 target control value (S170 and S180).

Figure 5:
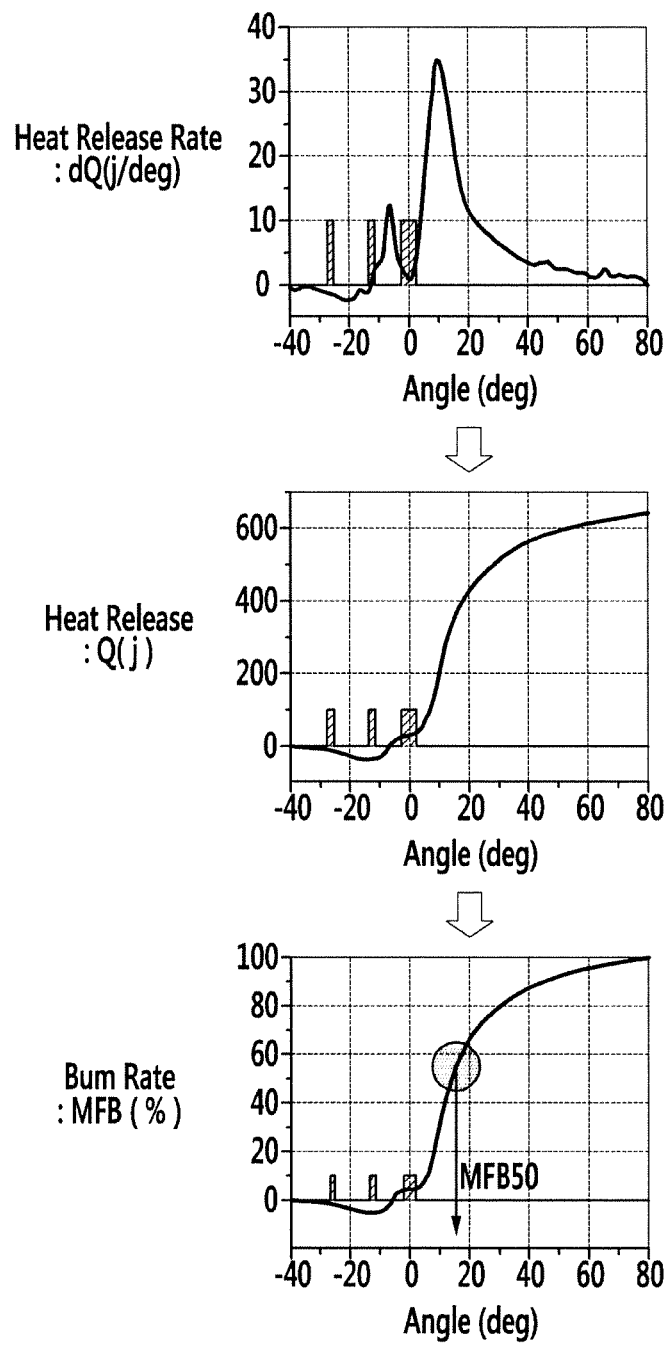

FIG. 5 is a graph for illustrating an operation of a method for controlling an engine using a combustion pressure sensor according to an exemplary embodiment of the present inventive concept.

Here, when both the difference (IMEP_COV_Dvt1) and the difference (IMEP_COV_Dvt2) are less than the predetermined value, the engine controller 100 may control the engine according to a conventional engine control method.

Accordingly, idle stability may be improved by reducing indicated mean effective pressure (IMEP) deviations for each cylinder and IMEP deviations for each driving cycle for an engine using a combustion signal red by a combustion pressure sensor according to the present disclosure.

While this disclosure has been described in connection with what is presently considered to be practical exemplary embodiments, it is to be understood that the disclosure is not limited to the disclosed embodiments, but on the contrary, is intended to cover various modifications and equivalent arrangements included within the spirit and scope of the appended claims.

What is claimed is:

1. A method for controlling an engine which includes a combustion pressure sensor, the method comprising steps of:
   receiving a combustion pressure signal from the combustion pressure sensor;
   calculating an indicated mean effective pressure (IMEP) deviation for each cylinder and an IMEP deviation for each driving cycle for the engine based on a combustion pressure according to the received combustion pressure signal;
   setting a main injection timing based on a difference between the IMEP deviations for the each cylinder and a difference between the IMEP deviations for the each driving cycle;
   comparing the difference between the IMEP deviations for the each cylinder and the difference between the IMEP deviations for the each driving cycle with an IMEP deviation reference;
   advancing a target ignition timing by a predetermined angle when the difference between the IMEP deviations for the each cylinder or the difference between the IMEP deviations for the each driving cycle is greater than the IMEP deviation reference; and
   driving the engine by injecting a fuel according to the set main injection timing.

2. The method of claim 1, wherein the step of advancing the target ignition timing by the predetermined angle comprises advancing a 50% mass fraction burned (MFB50) target control value.

3. The method of claim 2, further comprising updating the main injection timing according to the MFB50 target control value.

4. The method of claim 1, wherein the IMEP deviations for the each cylinder and the IMEP deviations for the each driving cycle are calculated by the following equation, $$IMEP\ deviation = (standard\ deviation\ IMEP)/(average\ IMEP).$$

5. A non-transitory computer-readably recording medium comprising computer executable instructions execution of which causes an engine controller to perform the method of claim 1.

6. A system for controlling an engine which includes a combustion pressure sensor, the system comprising:
   a coolant sensor configured to detect a coolant temperature;
   an atmospheric pressure sensor configured to detect atmospheric pressure;
   an atmospheric temperature sensor configured to detect atmospheric temperature; and
   an engine controller configured to receive signals from the combustion pressure sensor, the coolant sensor, the atmospheric pressure sensor, and the atmospheric temperature sensor and to control the engine based on the received signals,
   wherein the engine controller is operated by a predetermined program for executing a method for controlling the engine, the method comprising steps of:
   receiving a combustion pressure signal from the combustion pressure sensor;
   calculating an indicated mean effective pressure (IMEP) deviation for each cylinder and an IMEP deviation for each driving cycle for the engine based on a combustion pressure according to the received combustion pressure signal;
   setting a main injection timing based on a difference between the IMEP deviations for the each cylinder and a difference between the IMEP deviations for the each driving cycle;

comparing the difference between the IMEP deviations for the each cylinder and the difference between the IMEP deviations for the each driving cycle with an IMEP deviation reference;
advancing a target ignition timing by a predetermined angle when the difference between the IMEP deviations for the each cylinder or the difference between the IMEP deviations for the each driving cycle is greater than the IMEP deviation reference; and
driving the engine by injecting a fuel according to the set main injection timing.

* * * * *